United States Patent [19]

Watanabe

[11] Patent Number: 4,474,853

[45] Date of Patent: Oct. 2, 1984

[54] SORBENT COMPRISING SPHERICAL PARTICLES OF ACTIVATED CARBON DEPOSITING NON-CRYSTALLINE COMPOUND OF ZIRCONIUM AND PROCESS FOR PREPARING THEREOF

[75] Inventor: Kazuhiro Watanabe, Iwaki, Japan

[73] Assignee: Kureha Kagaku Kogyo Kabushiki Kaisha, Tokyo, Japan

[21] Appl. No.: 543,049

[22] Filed: Oct. 18, 1983

[30] Foreign Application Priority Data

Oct. 22, 1982 [JP] Japan .................... 57-185785

[51] Int. Cl.³ .......................... B32B 9/00; B05D 7/00
[52] U.S. Cl. .................................. 428/403; 427/215; 427/337; 427/372.2; 428/402; 428/408
[58] Field of Search ............ 428/306.6, 337, 307.3, 428/318.4, 307.7, 403, 402, 408; 427/215, 337, 372.2, 376.1; 604/29

[56] References Cited

U.S. PATENT DOCUMENTS 4,082,694  4/1978  Wennerberg et al. ............. 428/408

Primary Examiner—Marion McCamish
Assistant Examiner—William M. Atkinson
Attorney, Agent, or Firm—Oblon, Fisher, Spivak, McClelland & Maier

[57] ABSTRACT

Disclosed herein are a sorbent comprising spherical particles of activated carbon formed from a pitch and/or a synthetic, organic high polymer, to which a non-crystalline compound of zirconium has been deposited in an amount of 1 to 10% by weight (calculated as $ZrO_2$) to the weight thereof and a process for preparing the sorbent comprising the steps of impregnating the spherical particles of activated carbon with an aqueous solution of a water-soluble compound of zirconium and after treating the thus impregnated spherical particles of activated carbon with an alkali, thermally treating the thus treated spherical particles of activated carbon at a temperature of 400° to 1000° C.

12 Claims, 9 Drawing Figures

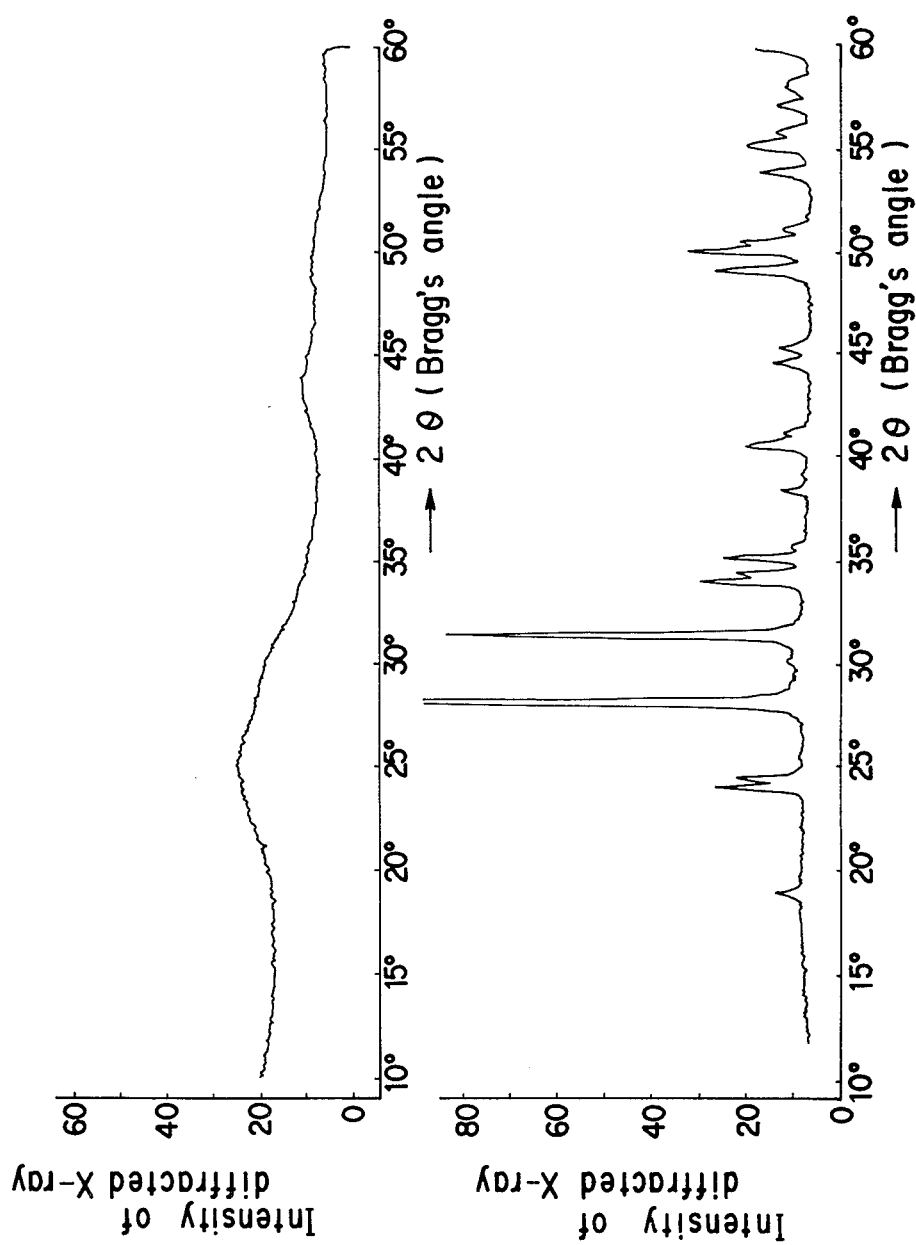

SORBENT COMPRISING SPHERICAL PARTICLES OF ACTIVATED CARBON DEPOSITING NON-CRYSTALLINE COMPOUND OF ZIRCONIUM AND PROCESS FOR PREPARING THEREOF

BACKGROUND OF THE INVENTION

The present invention relates to a sorbent (substance that sorbs) comprising spherical particles of activated carbon formed from a pitch and/or a synthetic, organic high polymer, to which a non-crystalline compound of zirconium has been deposited. More in detail, the present invention relates to a sorbent comprising spherical particles of activated carbon formed from a pitch and/or a synthetic, organic high polymer, to which a non-crystalline compound of zirconium has been deposited in an amount of 1 to 10% by weight (calculated as $ZrO_2$) of the amount of the sorbent and a process for preparing the sorbent comprising the steps of impregnating the spherical particles of activated carbon with an aqueous solution of a water-soluble compound of zirconium, treating the thus impregnated spherical particles of activated carbon with an alkali and thermally treating the thus treated spherical particles of activated carbon at a temperature of 400° to 1000° C. to obtain the sorbent comprising the spherical particles of activated carbon depositing a non-crystalline compound of zirconium in an amount of 1 to 10% by weight (calculated as $ZrO_2$) of the weight of the sorbent.

Within the living body of the patients having their hepatic- or renal functions impaired, decomposition of the poisonous substances within their body and excretion thereof from their body are hardly carried out, and accordingly, such poisonous substances (hereinafter referred to as toxins) accumulate within their body resulting in causing various physiological disturbances to the patient. Since the number of the patients having their hepatic- or renal functions impaired is in a tendency of increasing yearly, the development of the substitutive machinery and tools for excreting the toxins to outside of the patient's body in place of the impaired viscera, i.e., artificial viscera, has been eagerly desired.

At present, as the artificial viscera acting as a substitutive kidney, artificial kidney of removing hemo-toxins by blood dialysis has been most popularized. However, according to the demerits of such a type of artificial kidney of taking a long time for blood dialysis and of the heaviness of the apparatus for dialysis, the most popularized type of artificial kidney is not necessarily a satisfiable artificial kidney.

Under such conditions, the development of the type of artificial kidney utilizing adsorptive function of activated carbon has been promoted and studies for reducing the time of dialysis and for miniaturizing of the apparatus for dialysis have been promoted with the object of solving the demerits of the present type of artificial kidney.

Hitherto, it has been well known that the patients suffering from chronic renal failure show symptoms of hyperphosphatemia due to disturbance of phosphate excretion. Although it is possible to remove phosphate from the blood to an extent by blood dialysis, it is hardly possible to prevent the complication of hyperphosphatemia in the patient of chronic renal failure.

On the other hand, activated carbon utilized carefully in the artificial viscera scarcely causes disturbances on the patient to whom such an artificial viscera is applied, and it is excellent in removing organic metabolites such as creatinine, etc. from the blood. However, the activity of activated carbon in removing inorganic substances such as phosphate, etc. from the blood is extremely low, and accordingly, the effect of activated carbon in reducing the concentration of phosphate within the blood has not been expected. Consequently, the development of a sorbent having a capability of removing phosphates in the blood while retaining the capability of activated carbon of removing organic metabolites in the blood has been strongly desired.

SUMMARY OF THE INVENTION

In the first aspect of the present invention, there is provided a sorbent comprising spherical particles of activated carbon formed from a pitch and/or a synthetic, organic high polymer, to which a non-crystalline compound of zirconium has been deposited in an amount of 1 to 10% by weight (calculated as $ZrO_2$) of the sorbent which is obtained by the steps of impregnating the spherical particles of activated carbon with a water-soluble compound of zirconium, treating the thus impregnated spherical particles of activated carbon with an alkali and thermally treating the thus treated spherical particles of activated carbon at a temperature of 400° to 1000° C.

In the second aspect of the present invention, there is provided a process for preparing the sorbent comprising spherical particles of activated carbon formed from a pitch and/or a synthetic, organic high polymer, to which a non-crystalline compound of zirconium has been deposited in an amount of 1 to 10% by weight (calculated as $ZrO_2$) of the sorbent, the process comprising the steps of impregnating the spherical particles of activated carbon formed from a pitch and/or a synthetic, organic high polymer with an aqueous solution of a water-soluble compound of zirconium, thereby impregnating said spherical particles of activated carbon with said water-soluble compound of zirconium, treating the thus impregnated spherical particles of activated carbon with an alkali, and after washing the thus alkali-treated spherical particles of activated carbon with water, thermally treating the thus obtained spherical particles of activated carbon at 400° to 1000° C.

BRIEF DESCRIPTION OF THE DRAWINGS

FIG. 4 shows the X-ray diffraction pattern of the sorbent obtained in Example 1;

FIG. 5 shows the X-ray diffraction pattern of the substance obtained in Comparative Example 1;

DETAILED DESCRIPTION OF THE INVENTION

Figure 1:
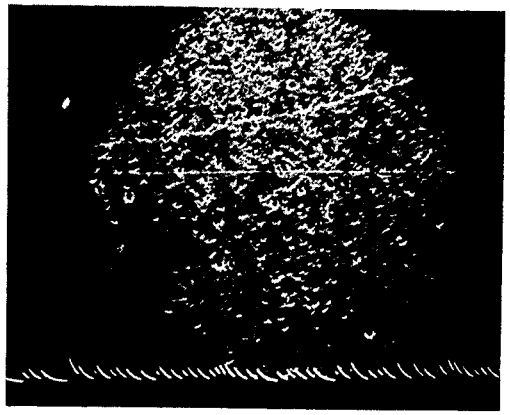
FIG. 1 is a photograph showing the cross-section of the spherical particles of activated carbon obtained in Preparative Example 1, taken by an X-ray microanalyzer.

The sorbent according to the present invention contains a non-crystalline compound of zirconium within the pores of the spherical particles of activated carbon, and has a structure never known fomerly. Namely, the non-crystalline compound of zirconium according to the present invention does not show any diffraction lines indicating the crystallinity within 10° to 60° of the Bragg's angle of $2\theta$ in the determination by X-ray diffraction. For instance, as is seen in FIG. 4, there is no reflected spectral line corresponding to $2\theta$.

As the spherical particles of activated carbon used in the present invention, those formed from a pitch and/or a synthetic, organic high polymer are preferable.

The spherical particles of activated carbon can be also formed by the processes, respectively disclosed in Japanese Patent Publication No. 50-18879 (1975), Japanese Patent Applications Laying-Open No. 56-69214 (1981) and No. 54-105897 (1979). As the synthetic, organic high-polymer, a thermosetting resin such as phenol/formaldehyde resin and epoxy resin, and a thermoplastic resin such as styrene resin, vinyl chloride resin and copolymeric resin thereof can be used for forming the spherical particles of activated carbon while using publicly known method(s). The activated carbon is preferably spherical in its shape from the view point of durability and capability of retaining the original shape, and the spherical particles of activated carbon having 0.05 to 3 mm in diameter, 500 to 2000 m²/g in specific surface area and 0.1 to 1.3 cm³/g of cumulated specific pore volume are preferable.

The compound of zirconium depositing to the spherical particles of activated carbon according to the present invention is formed from a water-soluble compound of zirconium such as a zirconium halide or a salt of oxyacids of zirconium. As zirconium halide, $ZrCl_2$, $ZrBr_2$, $ZrCl_3$, $ZrBr_3$, $ZrCl_4$, $ZrBr_4$ and $ZrI_4$ may be mentioned, and as the salts of oxyacids of zirconium, $Zr(NO_3)_4 \cdot 5H_2O$, $ZrO(NO_3)_2 \cdot 2H_2O$, $Zr(SO_4)_2$, $Zr(SO_4)_2 \cdot 4H_2O$ and $ZrO(SO_4)$ may be mentioned as well as $ZrOCl_2$.

In addition, the concentration of the compound of zirconium in an aqueous solution used in impregnating the spherical particles of activated carbon with the soluble compound of zirconium is 3 to 60% by weight.

After impregnating the spherical particles of activated carbon with the compound of zirconium, the thus-impregnated spherical particles of activated carbon are treated with an alkali. As the alkali used for that purpose, an aqueous ammonical solution, an aqueous solution of sodium hydroxide or potassium hydroxide, gaseous ammonia and the like may be mentioned, and gaseous ammonia and the aqueous ammoniacal solution are particularly desirable. The treatment with the alkali participates in making the water-soluble compound of zirconium non-crystalline and in the double decomposition of the zirconium halide or the salt of oxyacids of zirconium.

After being treated with tha alkali, the thus treated spherical particles of activated carbon is washed with water and thermally treated at a temperature of 400° to 1000° C., preferably 800° to 1000° C. In the case of thermal treatment at a temperature of below 400° C., there is a problem on the remained ammonia detectable by the odor thereof, and on the other hand, in the case of thermal treatment at a temperature over 1000° C., the sorptive activity is not so much larger than in the case of 400° to 1000° C. in spite of larger consumption of thermal energy.

It is preferable in the present invention that the amount of the deposited, non-crystalline compound of zirconium to the sorbent of the present invention is 1 to 10% by weight (calculated as $ZrO_2$) of the sorbent. In the case of smaller than 1% by weight, the sorptive activity on phosphate is too small. On the other hand, in the case of larger than 10% by weight, it is difficult to deposite the larger amount of crystalline compound of zirconium to the spherical particles of activated carbon, and a large improvement of the sorptive activity by the larger amount of deposition of such a compound is not actually carried out.

The sorbent of the present invention comprises the spherical particles of activated carbon formed from a pitch and/or a synthetic, organic high polymer and the non-crystalline compound of zirconium depositing thereto, and accordingly, it is quite different from the conventional sorbent prepared by shaping the hydrate of zirconium oxide. Namely, the sorbent of the present invention has an extremely excellent sorptive activity to phosphorus components such as phosphate ions, and has retained the sorptive activity of activated carbon, for instance, the sorptive activity to iodine, creatinine, vitamin $B_{12}$, inulin, etc. and the decolouring activity to caramel, and accordingly, the sorbent of the present invention can be suitably applied as the sorbent for use in artificial viscera as well as the sorbent for use in tap water-treatment and in waste water-treatment, naturally.

The present invention will be explained more in detail while referring to Preparative Examples and Examples unlimitatively as follows.

PREPARATIVE EXAMPLE 1

Preparation of Spherical Particles of Activated Carbon

Into a one-liter autoclave, 300 parts by weight of a pitch of a softening point of 190° C., a content of quinoline-insoluble component of 30% by weight and an atomic ratio of H/C of 0.6, obtained by thermal cracking of petroleum, 100 parts by weight of naphthalene and an amount of polyethylene corresponding to 2% by weight of the pitch were introduced, and the content was mixed in a molten state by heatng to 180° C. and stirring the content for 2 hours. Then, the thus molten mixture was poured into an aqueous 0.5% by weight solution of polyvinyl alcohol, which had been preliminarily heated to 160° C., while stirring the content.

By stirring the content for further 20 min at 1200 r.p.m., the molten mixture was dispersed in the aqueous solution as minute spherical particles, and then, by cooling, a dispersion of spherical particles of the pitch mixture of 850 micrometer in a mean diameter was obtained.

After dehydrating the pitch mixture, naphthaline therein was extracted and removed by n-hexane from the pitch mixture, and the thus treated spherical particles were treated as a fluidized bed by air while heating from room temperature to 300° C. at a rate of 30° C./min to obtain infusibilized spherical particles of the pitch. Subsequently, 100 g of the thus obtained spherical particles of the pitch were heated in water vapour to 900° C. to be carbonized, and the thus carbonized pitch particles were kept at 900° C. for 2 hours to obtain the spherical particles of activated carbon.

The mean diameter of the thus obtained spherical particles of activated carbon was 800 micrometer.

PREPARATIVE EXAMPLE 2

Preparation of Spherical Particles of Activated Carbon

Into an autoclave provided with a stirrer, 750 parts by weight of a pitch of a softening point of 182° C., a content of quinoline-insoluble component of 10% by weight and an atomic ratio of hydrogen to carbon of 0.53, formed by petroleum-thermal cracking and 250 parts by weight of naphthalene were introduced, and the content of the autoclave was heated to 210° C. while mixing the content by stirring. After cooling the mixture in the autoclave to 80° to 90° C., thereby adjusting the melt-viscosity of the molten mixture to a suitable value for melt-extrusion thereof, the mixture was extruded at a rate of 500 g per min under a pressure of 50 kg/cm$^2$ from a nozzle having 10 spinning holes of 1.0 mm in diameter, provided at the bottom of the autoclave. The thus extruded string-like mixture was stretched longitudinally by introducing thereof into a cooling water at 10° to 25° C. in a cooling vessel via a trough with an inclination of about 40° through which water was let flow-down at a rate of 3 m/sec. Thus, the string-likely shaped mixture of about 500 micrometer in mean diameter accumulated in the cooling vessel. After leaving the string-likely shaped mixture for about one min in water, thereby obtaining the solidified, string-likely shaped mixture in a state of being easily snapped by hands, the thus obtained, solidified string-likely shaped mixture was cut into the stick-like matter by treating the former in a high-speed cutter for 10 to 30 sec with the addition of a suitable amount of water. Under a microscope, the ratio of the length to the diameter of the thus obtained stick-kike matter was 1.5 on the average.

Then, after collecting the thus prepared stick-like matter by filtration, 10 parts by weight of the stick-like matter was introduced into 100 parts by weight of an aqueous 0.5% by weight solution of polyvinyl alcohol at 90° C. and by stirring the mixture, the stick-like matter was molten and an aqueous dispersion of the molten matter in a state of spherical particles was obtained.

By cooling the aqueous dispersion while stirring thereof, a slurry of the solidified spherical particles of the mixture of the pitch and naphthalene was formed, the mean diameter of the thus obtained spherical particles being 850 micrometers.

The thus obtained spherical particles were subjected to extraction with n-hexane for the removal of naphthalene therefrom, and the thus de-naphthalenized spherical particles (hereinafter referred to beads) were subjected to oxidative infusibilization as a fluidized bed while using air, under the conditions of oxidative infusibilization of heating to 300° C. at a rate of 30° C./min by blowing air at a rate of 20 liters/min per 100 g of the beads. Thereafter, 100 g of the thus infusibilized beads were heated to 900° C. at a rate of 200° C./hour in a state of fluidized bed by a 1:1 by volume mixture of gaseous nitrogen and water vapour and by keeping the beads for 2 hours at 900° C., the spherical particles of activated carbon of a mean diameter of 800 micrometers were obtained.

PREPARATIVE EXAMPLE 3

Preparation of Spherical Particles of Activated Carbon

Particles of polyvinylidene chloride (mean diameter of the particles of 900 micrometers) were subjected to the simultaneous dehydrochlorination and polycondensation in a quartz tube of 500 mm in inner diameter as a fluidized bed by blowing heated air into the tube and heating the tube from room temperature to 300° C. at a rate of 10° C./hour to obtain the infusibilized spherical particles of the thus dehydrochlorinated and polycondensed copolymer.

One hundred grams thereof were carbonized by heating thereof in water vapour to 900° C. and the thus carbonized product was kept for 2 hours at 900° C. to obtain the spherical particles of activated carbon of a mean diameter of 800 micrometers.

EXAMPLE 1

Preparation of the Sorbent according to the present invention

Into 300 ml of an aqueous 27% by weight solution of $ZrOCl_2$ prepared by dissolving the corresponding amount of zirconium oxychloride octahydrate ($ZrOCl_2.8H_2O$) in water, 100 g of the spherical particles of activated carbon obtained in Preparative Example 1 were introduced, and the mixture was treated for 2 hours in a rotary evaporator on a hot water bath at 50° C. to impregnate the sperical particles of activated carbon with the zirconium component.

After collecting the thus zirconium-impregnated spherical particles of activated carbon by filtering the mixture, the thus collected spherical particles were introduced into 500 ml of an aqueous 10% by weight solution of ammonia, and after stirring the aqueous mixture for 2 hours, the zirconium-impregnated spherical particles of activated carbon were collected by filtering the aqueous solution. Then, the thus collected spherical particles were washed well with water, heated to 900° C. at a rate of 200° C. per hour in a flow of gaseous nitrogen, and kept at 900° C. for one hour in the flow of gaseous nitrogen. By cooling the thus heated spherical particles, a sorbent to which about 8.8% by weight (calculated as $ZrO_2$) of a compound of zirconium deposited was obtained.

Figure 2:
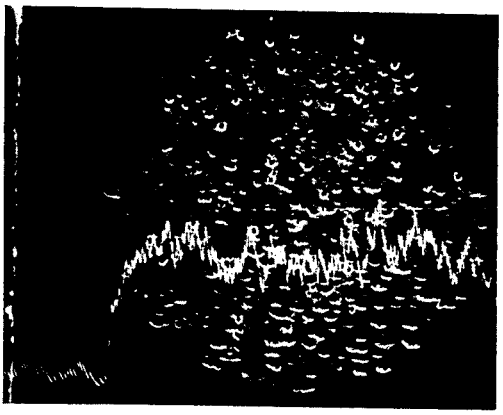
FIG. 2 is a photograph of the cross-section of the sorbent obtained in Example 1, taken by an X-ray microanalyzer.

It was found that the state of deposition of zirconium in the sorbent prepared in Example 1, at least in the cross-section of the spherical particles of the sorbent was uniform as shown in FIG. 2 which shows the cross-sectional view of the sorbent prepared in Example 1 together with the result of examination by an X-ray microanalyzer as compared to the cross-section of the spherical particles of activated carbon prepared in Preparative Example 1 together with the result of examination by the X-ray microanalyzer. In both FIGS. 1 and 2, the respective lines in the central part thereof is a scanning line by X-ray, and the wavy line is the spectrum derived from zirconium. While in FIG. 1, the height of the wavy line is almost zero, the height of the wavy line in FIG. 2 is large and uniform, showing the uniform distribution of zirconium in the cross-section of the spherical particle of the sorbent according to the present invention, and the absence of any zirconium in the particles of activated carbon prepared in Preparative Example 1.

EXAMPLE 2

Preparation of the Sorbent according to the present invention

The sorbent according to the present invention, to which 6.5% by weight (calculated as $ZrO_2$) of a non-crystalline compound of zirconium had been deposited was obtained from the spherical particles of activated carbon prepared in Preparative Example 1 by the same procedures as in Example 1 except for using the aqueous solution of zirconium oxychloride at a concentration of 19% by weight instead of 27% by weight in Example 1.

EXAMPLE 3

Preparation of the Sorbent according to the present invention

The sorbent according to the present invention, to which 4.0% by weight (calculated as $ZrO_2$) of a non-crystalline compound of zirconium had been deposited was obtained from the spherical particles of activated carbon prepared in Preparative Example 1 by the same procedures as in Example 1 except for using the aqueous solution of zirconium oxychloride at a concentration of 11% by weight instead of 27% by weight in Example 1.

EXAMPLE 4

Preparation of the Sorbent according to the present invention

The sorbent according to the present invention, to which 1.5% by weight (calculated as $ZrO_2$) of a non-crystalline compound of zirconium had been deposited was obtained from the spherical particles of activated carbon prepared in Preparative Example 1 by the same procedures as in Example 1 except for using the aqueous solution of zirconium oxychloride at a concentration of 5% by weight instead of 27% by weight in Example 1.

EXAMPLE 5

The sorbent according to the present invention, to which 8.7% by weight (calculated as $ZrO_2$) of a non-crystalline compound of zirconium had deposited was obtained by the same procedures as in Example 1 except for using the spherical particles of activated carbon prepared in Preparative Example 2.

EXAMPLE 6

The sorbent according to the present invention, to which 8.7% by weight (calculated as $ZrO_2$) of the non-crystalline compound of zirconium had been deposited was prepared by the same procedures as in Example 1 except for using the spherical particles of activated carbon prepared in Preparative Example 3.

EXAMPLE 7

The sorbent according to the present invention, to which 8.7% by weight (calculated as $ZrO_2$) of a non-crystalline compound of zirconium had been deposited was obtained from the spherical particles of activated carbon prepared in Preparative Example 1 by the same procedures as in Example 1 except for using an aqueous 50% by weight solution of zirconium sulfate $(Zr(SO_4)_2.4H_2O)$ instead for the aqueous 27% by weight solution of zirconium oxychloride $(ZrOCl_2.8H_2O)$ in Example 1.

COMPARATIVE EXAMPLE 1

Into a 300-liter autoclave provided with a stirrer, 750 parts by weight of a pitch of the softening point of 182° C., the content of the quinoline-insoluble component of 10% by weight and the atomic ratio of hydrogen to carbon of 0.56 formed by thermal cracking of petroleum, 250 parts by weight of naphthalene and 125 parts of fine particles of zirconium oxide showing a diameter of 500 to 1000 Å and a monoclinic diffraction pattern in the examination by X-ray diffraction analysis were introduced, and the content of the autoclave was mixed and molten by stirring and heating thereof for 1 hour at 210° C. After cooling the molten mixture to 80° to 90° C. to adjust the viscosity thereof to a value suitable for extrusion spinning thereof, the molten mixture was extruded at a rate of 500 g/min from the nozzle having 10 holes of 1.0 mm in diameter provided at the bottom of the autoclave under a pressure of 50 kg/cm², thereby obtaining a string-like mixture. By treating the thus obtained string-like mixture as in Preparative Example 2, a substance containing 36% by weight (calculated as $ZrO_2$) of zirconium oxide was obtained.

Figure 3:
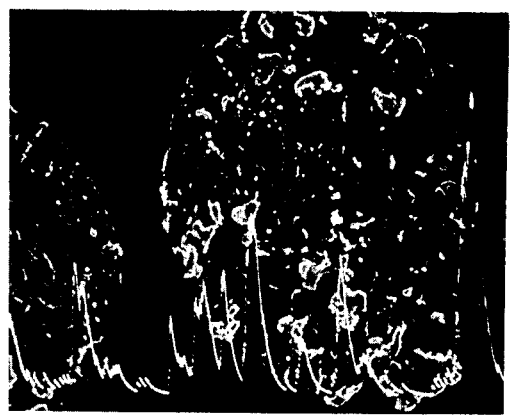
FIG. 3 is a photograph of the cross-section of the substance obtained in Comparative Example 1, taken by an X-ray microanalyzer.

It was found that the thus obtained substance contained monoclinically crystalline zirconium oxide distributed unevenly in the substance as are seen from the X-ray diffraction pattern shown in FIG. 5 and from the cross-sectional view in FIG. 3 wherein the wavy line by the X-ray microanalyzer showed the remarkable rises and falls.

COMPARATIVE EXAMPLE 2

Figure 6:
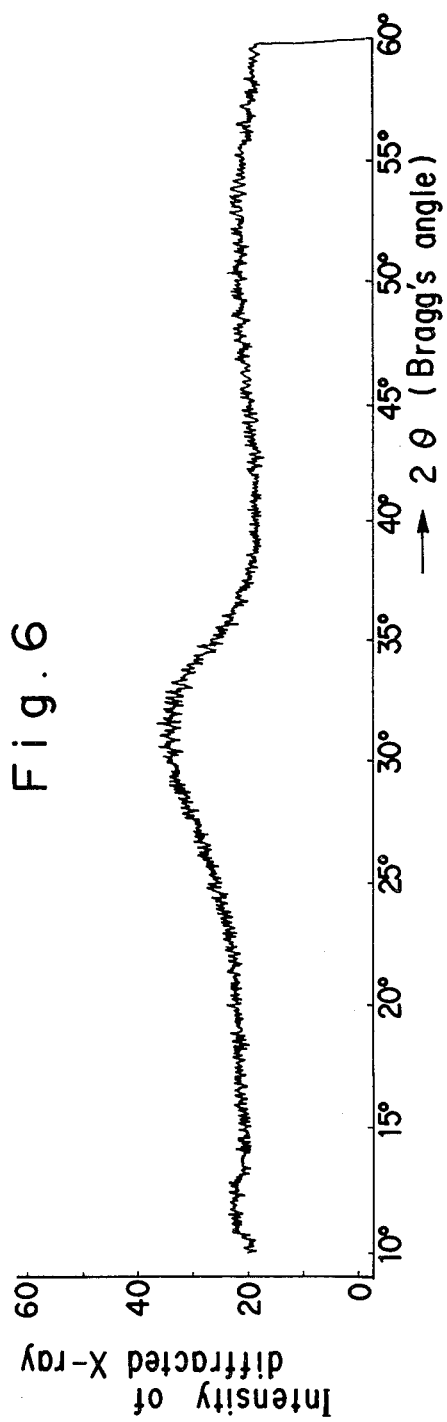
FIG. 6 shows the X-ray diffraction pattern of zirconium hydroxide.

Into an autoclave provided with a stirrer, 750 parts by weight of the same pitch as that used in Comparative Example 1, 250 parts by weight of naphthalene and 160 parts by weight of zirconium hydroxide represented by the formula $ZrO_2.2.9H_2O$ showing a no peak in X-ray diffraction pattern of FIG. 6 were introduced, and the content was mixed for one hour at 250° C. to be molten. After adjusting the viscosity of the molten mixture to a value suitable for melt-extruding, by cooling thereof to 80° to 90° C., the molten mixture was extruded under the same conditions as in Comparative Example 1, and the extruded string-like mixture was treated by the same procedures in Preparative Example 2 to obtain a substance containing 36% by weight (calculated as $ZrO_2$) of a compound of zirconium.

Figure 7:
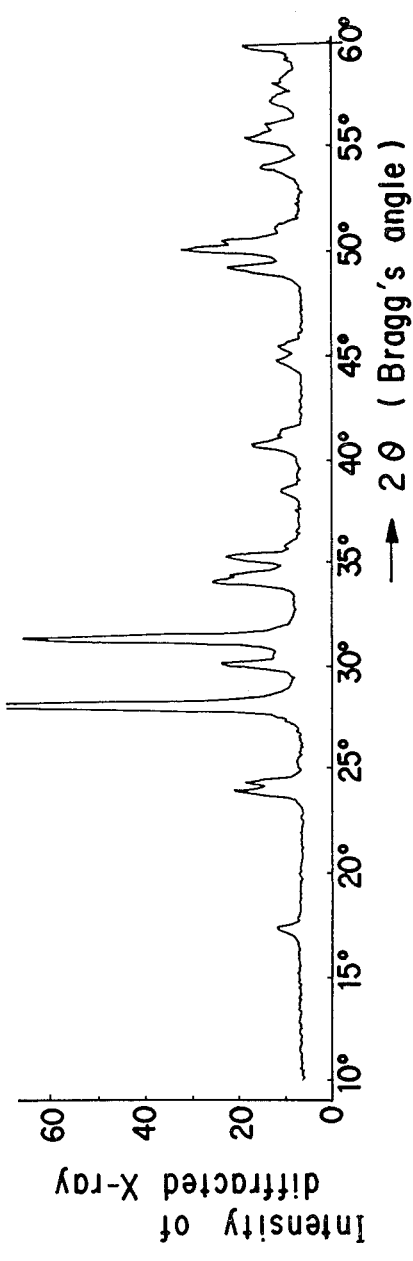
FIG. 7 shows the X-ray diffraction pattern of the substance obtained in Comparative Example 2 and FIGS. 8 and 9 are the diagrams of adsorption isotherm of the respective specimens.

It was found by X-ray diffraction analysis that the thus obtained substance contained monoclinical crystals of a compound of zirconium showing the diffraction pattern in FIG. 7.

EXAMINATIONAL TEST

Physical properties including the sorptive- or adsorptive activity of the sorbents, respectively prepared in Examples 1 to 7 and of the substances, respectively prepared in Comparative Examples 1 and 2 are shown in the following Table, together with those of the activated carbon prepared in Preparative Example 1.

As are seen in Table, the sorptive activity to phosphates (calculated as P) of the sorbents according to the present invention is extremely excellent and the adsorptive features of the activated carbon itself are retained in the sorbent.

Figure 8:
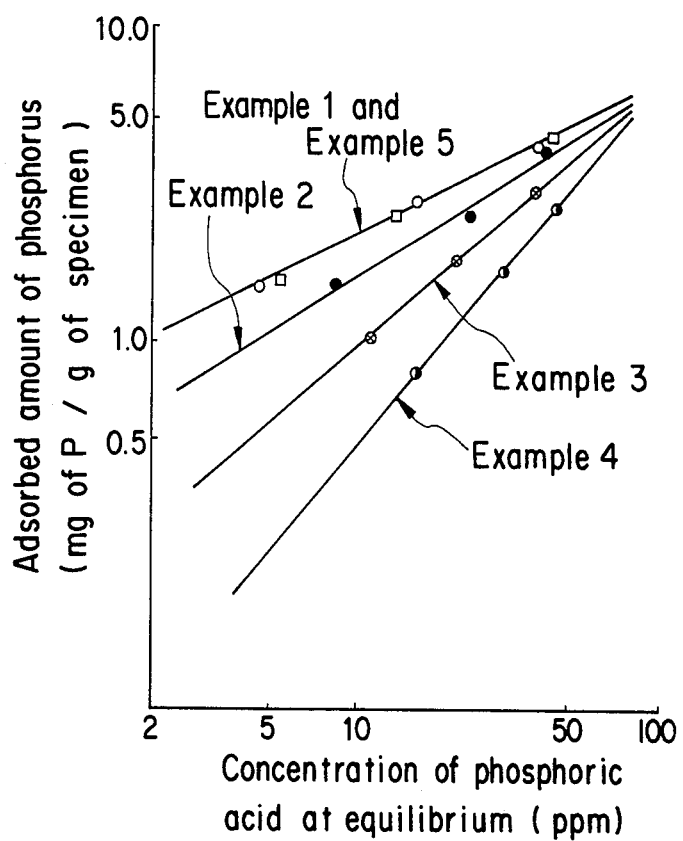
Figure 9:
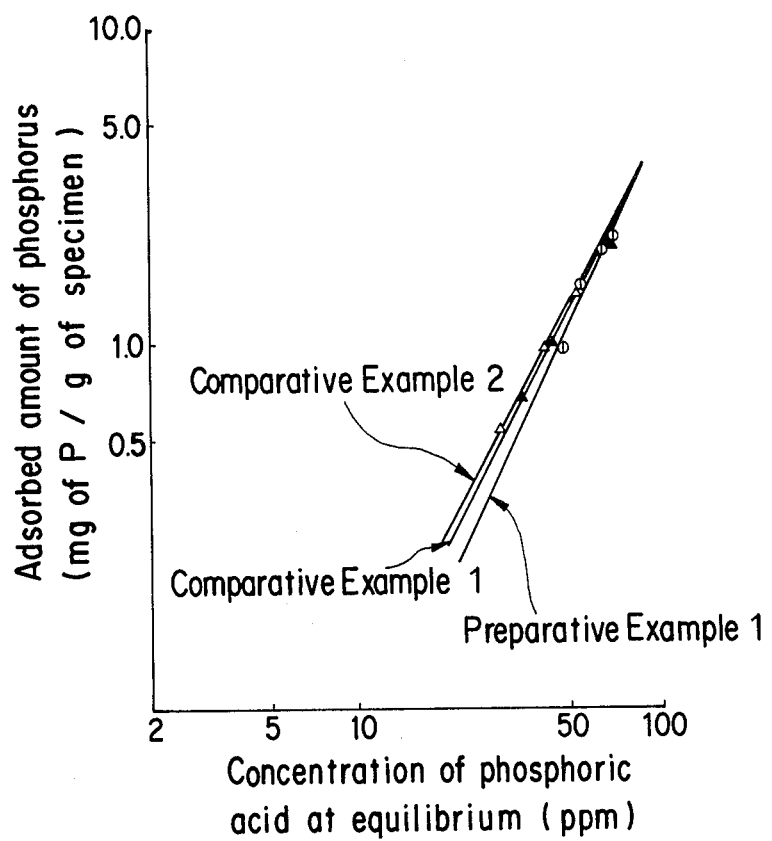

FIGS. 8 and 9 show the adsorption isotherms of the specimens prepared in Examples 1 to 5, Comparative Examples 1 and 2, and Preparative Example 1 on phosphate at a temperature of 20° C. and the initial concentration of phosphoric acid of 105 ppm.

In FIG. 8, the data obtained on the sorbents, respectively prepared in Example 1 are represented by the points ( ○ ), prepared in Example 2 are represented by the points ( ⊙ ), prepared in Example 3 are represented by the points ( ⊗ ), prepared in Example 4 are represented by the points ( ◐ ) and prepared in Example 5 are represented by the points (□).

In FIG. 9, the data obtained on the sorbents, respectively prepared in Comparative Example 1 are represented by the points ( ▲ ) and prepared in Comparative Example 2 are represented by the points (△), and the data obtained on the spherical particles of activated carbon prepared in Preparative Example 1 are represented by the points ( ① ).

As is clearly seen above, the sorbent according to the present invention is extremely superior in sorptive activity to the substances prepared by the process comprising the step of mixing the pitch as a raw material with a compound of zirconium in the raw material stage in Comparative Examples 1 and 2, respectively.

in the filtrate was determined to obtain the sorption rate according to the formula:

$$\text{Sorption rate (\%)} = \left(1 - \frac{C}{C_o}\right) \times 100$$

wherein $C_o$ is the initial concentration of creatinine, vitamin $B_{12}$ or inulin (mg/dl) and C is the concentration thereof in the filtrate.

(6) Sorbed amount of phosphate ion by each specimen was determined as follows:

Into a separatory funnel, a predetermined amount of each specimen of the sorbents is introduced and after adding 50 ml of an aqueous solution of potassium dihy-

TABLE

| Specimen prepared in | Component of sorbent | | | Sorbed amount of | | Decoloration rate of carmel (%) | Sorption rate (%) of | | |
|---|---|---|---|---|---|---|---|---|---|
| | Activated carbon prepared in | Compound of zirconium | | phosphorus (mg P/g[1]) | Iodine (mg/g[1]) | | Creatinine | V-$B_{12}$ | Inulin |
| | | deposited amount | crystal system | | | | | | |
| Example 1 | Prep. Ex-1 | 8.8 | non-cryst. | 3.9 | 1100 | 95 | 95 | 89 | 85 |
| Example 2 | Prep. Ex-1 | 6.5 | non-cryst. | 3.3 | 1100 | 98 | 98 | 91 | 88 |
| Example 3 | Prep. Ex-1 | 4.0 | non-cryst. | 2.5 | 1150 | 98 | 98 | 93 | 90 |
| Example 4 | Prep. Ex-1 | 1.5 | non-cryst. | 1.7 | 1200 | 98 | 99 | 93 | 90 |
| Example 5 | Prep. Ex-2 | 8.7 | non-cryst. | 3.6 | 1000 | 94 | 89 | 83 | 85 |
| Example 6 | Prep. Ex-3 | 8.7 | non-cryst. | 3.5 | 1000 | 93 | 90 | 81 | 84 |
| Example 7 | Prep. Ex-1 | 8.7 | non-cryst. | 3.8 | 1050 | 95 | 93 | 85 | 86 |
| Preparative[3] Example 1 | Prep. Ex-1 | 0 | — | 0.4 | 1200 | 98 | 99 | 93 | 90 |
| Comparative Example 1 | Comparative Example 1 | 36.0 | monoclinic | 0.5 | 1010 | 70 | 85 | 84 | 85 |
| Comparative Example 2 | Comparative Example 1 | 36.0 | monoclinic | 0.5 | 1000 | 75 | 88 | 86 | 87 |

Notes:
[1] per gram of the specimen
[2] % by weight
[3] Preparation of spherical particles of activated carbon The methods for determination of the physical properties including the sorptive- and adsorptive activities of the sorbents prepared in Examples and those of the spherical particles of activated carbon prepared in Preparative Example 1 shown in Table are briefly explained as follows:

(1) Deposited amount of the compound of zirconium: Calculated from the amount of ash(calculated as $ZrO_2$) remained after the specimen was calcined in an oxidative atmosphere for 4 hours at 900° C.

(2) Crystalline state of the compound or zirconium deposited to or contained in the sorbent: Determined by X-ray diffraction pattern.

(3) Sorbed amount of elementary phosphorus: Determined from the sorbed amount at an equilibrium when the concentration of phosphoric acid was reduced to 30 ppm after starting at the initial concentration of phosphoric acid in the aqueous solution of 105 ppm.

(4) Sorption rate of iodine was measured according to Japanese Industrial Standards(JIS) K-1474/1975, and Decoloration rate of caramel was measured according to JIS K-1470/1975.

(5) Sorption rate of creatinine, vitamin $B_{12}$ or inulin: Into 100 ml of an aqueous phosphate buffer (pH of 7.4) solution containing creatinine, vitamin $B_{12}$ or inulin at a concentration of 100 ppm, one gram of each of the specimen was added, and the mixture was shaken for 3 hours at 37° C., and after filtering the mixture to separate the solid matter and the solution, the concentration of creatinine, vitamin $B_{12}$ of inulin drogen phosphate at a concentration of 105 ppm into the funnel, bubbles are removed from the specimen by applying a reduced pressure of 30 Torr g, and the funnel is shaken for 2 hours. Thereafter, the aqueous solution in the funnel is collected and the amount of remaining phosphate ions therein is determined at 20° C. by molybden blue method. From the thus obtained amount, the amount sorbed to the specimen is obtained.

What is claimed is:

1. A sorbent comprising spherical particles of activated carbon having incorporated therein 1 to 10% by weight (calculated as $ZrO_2$) of a non-crystalline compound of zirconium obtained by impregnating the spherical particles of activated carbon formed from a pitch and/or a synthetic, organic high polymer with an aqueous solution of a water-soluble compound of zirconium, treating the thus impregnated spherical particles of activated carbon with an alkali and thermally treating the thus treated spherical particles of activated carbon at a temperature of 400° to 1000° C.

2. A sorbent according to claim 1, wherein said spherical particles of activated carbon have 0.05 to 3.00 mm in diameter, 500 to 2000 m²/g in specific surface area and 0.1 to 1.3 cm³/g in specific cumulative pore volume.

3. A sorbent according to claim 1, wherein said non-crystalline compound of zirconium does not show any diffraction lines within the range of 10° to 60° of Bragg's angle of $2\theta$ on a X-ray diffraction pattern of the sorbent.

4. A sorbent according to claim 1, wherein said water-soluble compound of zirconium is a water-soluble zirconium halide or a water soluble salt of an oxy-acid of zirconium.

5. A sorbent according to claim 1, wherein said water-soluble compound of zirconium is zirconium oxychloride.

6. A process for preparing a sorbent comprising spherical particles of activated carbon having incorporated therein 1 to 10% by weight (calculated as $ZrO_2$) of a non-crystalline compound of zirconium, which comprises immersing said spherical particles of activated carbon formed from a pitch and/or a synthetic, organic high polymer with an aqueous solution of a water-soluble compound of zirconium, treating the thus impregnated spherical particles of activated carbon with an alkali, and thermally treating the thus treated spherical particles of activated carbon at 400° to 1000° C.

7. A process for preparing a sorbent according to claim 6, wherein said water-soluble compound of zirconium is a water-soluble zirconium halide or a water-soluble salt of an oxyacid of zirconium.

8. A process for preparing a sorbent according to claim 7, wherein said water-soluble zirconium halide is one compound selected from the group consisting of $ZrCl_2$, $ZrBr_2$, $ZrCl_3$, $ZrBr_3$, $ZrCl_4$, $ZrBr_4$ and $ZrI_4$.

9. A process for preparing a sorbent according to claim 7, wherein said water-soluble salt of an oxyacid of zirconium is one compound selected from the group consisting of $Zr(NO_3)_4.5H_2O$, $Zr(SO_4)_2$, $ZrO(NO_3)_2.2H_2O$, $Zr(SO_4)_2.2H_2O$ and $ZrO(SO_4)$.

10. A process for preparing a sorbent according to claim 6, wherein said water-soluble compound of zirconium is zirconium oxychloride.

11. A process for preparing a sorbent according to claim 6, wherein the concentration of the aqueous solution of a compound of zirconium is 3 to 60% by weight.

12. A process for preparing a sorbent according to claim 6, wherein said treatment with an alkali is carried out while using an aqueous solution of ammonia or a gaseous ammonia as an alkali.

* * * * *